T. H. RUSHTON.
VEHICLE WHEEL.
APPLICATION FILED SEPT. 16, 1911.

1,033,944.

Patented July 30, 1912.

2 SHEETS—SHEET 1.

T. H. RUSHTON.
VEHICLE WHEEL.
APPLICATION FILED SEPT. 16, 1911.
1,033,944.
Patented July 30, 1912.
2 SHEETS—SHEET 2.
FIG. 4.
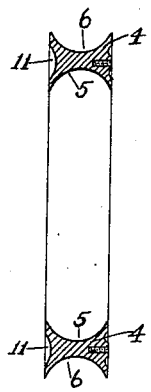
FIG. 5.
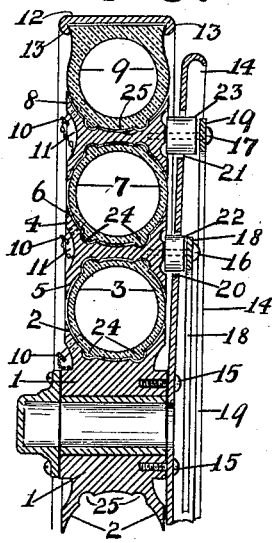
FIG. 6.
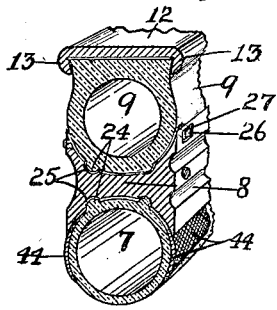
FIG. 7.
FIG. 8.
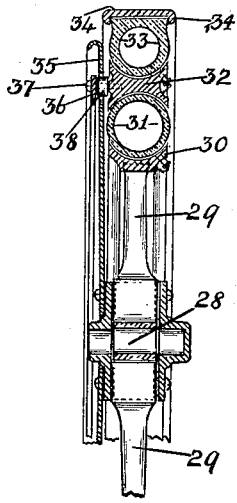
FIG. 9.
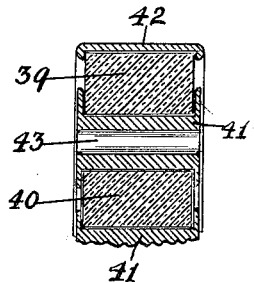
FIG. 10.
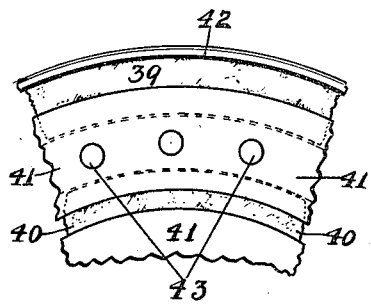
Witnesses:
Wm H Bates
G. M. Copenhaver
Inventor.
Thomas H. Rushton
by Herbert W. Jenner.
Attorney.

UNITED STATES PATENT OFFICE.

THOMAS HENRY RUSHTON, OF GRIMSBY, ENGLAND.

VEHICLE-WHEEL.

1,033,944. Specification of Letters Patent. Patented July 30, 1912.

Application filed September 16, 1911. Serial No. 649,686.

*To all whom it may concern:*

Be it known that I, THOMAS HENRY RUSHTON, a subject of the King of Great Britain, residing at New Cleethorpes, Grimsby, in the county of Lincoln, England, have invented certain new and useful Improvements in Vehicle-Wheels; and I do hereby declare the following to be a full, clear, and exact description of the invention, such as will enable others skilled in the art to which it appertains to make and use the same.

My invention relates to improvements in wheels for motor and other road vehicles, bicycles and the like, and has for its object to produce a wheel which will among other things, be possessed of great resiliency, will adapt itself to unevenness of the road or ground and to curves in such a manner that a flat tread or bearing surface is always presented, and will be unpuncturable, hence the upkeep will be exceedingly small as compared with that of existing wheels having pneumatic tires.

Figure 1:
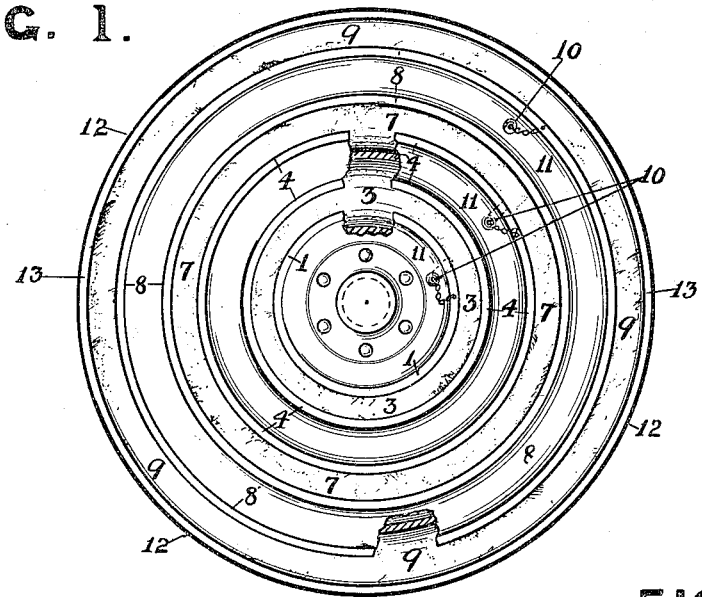
Figure 2:
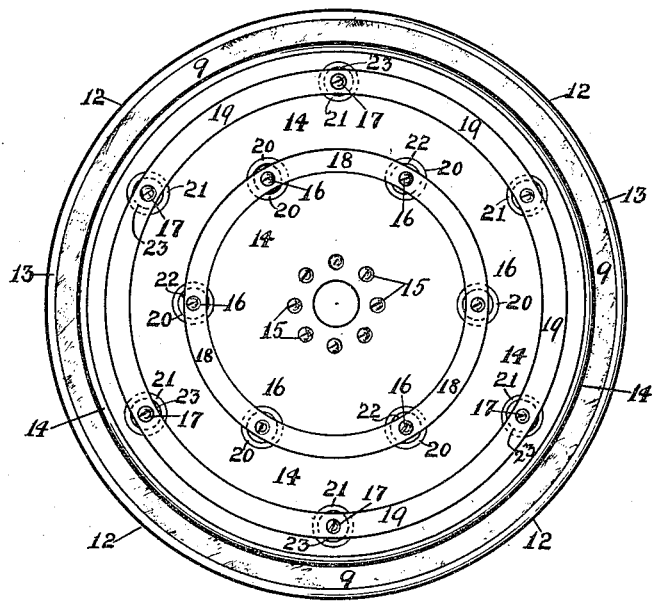
Figure 3:
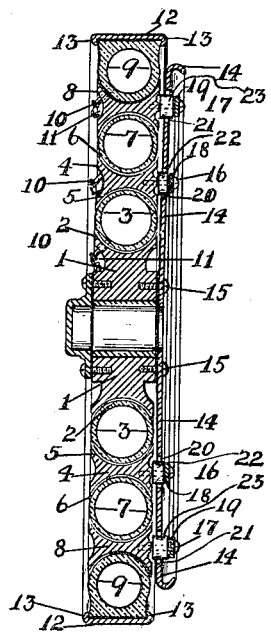

In the accompanying drawings, Figure 1 represents a spokeless wheel constructed in accordance with my invention, parts being broken away to enable other parts behind to be seen. Fig. 2 is an elevation of the back of the same. Fig. 3 is a vertical transverse section. Fig. 4 is a transverse section of one of the metal or like strong rings having an inner and an outer groove. Fig. 5 is a transverse section of a portion of the wheel. Fig. 6 is a perspective view of a portion of the wheel showing a means for preventing creeping or annular movement of the elastic band or tube. Fig. 7 is a transverse section of a portion of a wheel in which the elastic portions are comprised by an air tube and an outer cover inclosing the air tube. Fig. 8 is a transverse section of a portion of a wheel provided with spokes. Fig. 9 is a transverse section of a portion of a wheel showing an elastic band of rectangular shape in cross section and a ring for receiving the same, and Fig. 10 is a side view of Fig. 9. Figs. 5, 6, 7, 8, 9 and 10 are drawn to a larger scale than the other figures.

A wheel in accordance with my invention is composed of a plurality of elastic bands or elastic inflatable tubes and of a suitable annularly grooved ring or plurality of such rings arranged concentrically with or around the wheel hub, the first elastic band or tube being fitted in an annular groove in or on the periphery of the wheel hub, or in a trough shaped rim carried by the ends of the spokes, as the case may be, and the remaining elastic band or bands or tube or tubes arranged concentrically therewith.

In constructing a spokeless wheel, I provide the wheel hub 1 with an annular groove or trough 2 which is either formed in the hub itself or in a rim secured to the periphery of the hub, and I place an elastic band or an inflatable elastic tube 3 in the annular groove 2 in such hub or rim 1, the said elastic band or tube 3 being of such a diameter as to fit tightly in the said groove 2. On the elastic band or tube 3 I place a metal, wood or other suitable strong ring 4 having an inner annular groove 5 and an outer annular groove 6, the said metal or like ring being of such a diameter as to fit tightly on the elastic band or tube 3, and in the outer annular groove 6 of the said metal or like ring 4 I fit an elastic band or tube 7 of such a diameter or size as to fit tightly in such groove, and on the elastic band or tube 7 I may place a tightly fitting metal, wood or other strong ring 8 similar in shape to the ring 4 but of larger diameter, and in the outer groove of such ring place a tightly fitting elastic band or tube 9. I thus have a wheel composed of a hub 1, an elastic band or inflatable tube 3 tightly encircling such hub, a metal or like strong ring 4 tightly encircling the elastic band or tube 3, an elastic band or tube 7 tightly encircling the ring 4, a metal or like strong ring 8 tightly encircling the elastic band or tube 7, and an elastic band or tube 9 tightly encircling the metal or like ring 8, as shown at Figs. 1, 3 and 5 of the accompanying drawings. I may however, vary the number of elastic bands or tubes and metal or like grooved rings, depending upon the size of wheel to be produced, but the number of elastic bands or tubes I shall employ will not be less than two and consequently at least one metal or like grooved ring such as 4 will be necessary.

When inflatable tubes are employed, the valves 10 of such tubes, or of the air tubes, when air tubes inclosed within outer covers are employed as illustrated at Fig. 7 of the drawings, are passed through holes or notches in one side of the hub and of the metal or like ring or rings, which are each preferably provided with an annular side groove 11 into which such valves project and by which they are protected.

For the purpose of protecting the outer or last fitted elastic band or tube of the wheel against wear and also against the liability to be punctured if it is in the form of an inflatable tube, I may provide such outer band or tube with a metal hoop or tire of any suitable kind, to receive which, I preferably thicken the periphery of such band or tube in such a way as to form a flat periphery or tread on which I place a metal hoop 12 having side flanges 13 adapted to engage the sides of the tread of the band or tube, as shown at Figs. 1, 2, 3, and 5 to 10 inclusive of the drawings.

To obviate any liability of displacement of the elastic bands or tubes and of the metal or like grooved ring or rings as a result of lateral strain or twisting of the wheel when in use, or from any other cause, I secure a strong dished metal disk or plate 14 or the equivalent to the back of the wheel, said disk or the like being secured to the hub 1 by screws 15 or the equivalent and to the metal or like grooved ring or rings by screws 16, 17 or the equivalent, the screws 16, 17 passing through metal rings 18, 19 and through holes 20, 21 in the metal disk or the like 14, the holes 20, 21 being sufficiently large to leave ample room for movement of the disk or the like on compression of the wheel taking place as a result of such wheel bearing on the ground. Rollers 22, 23 are by preference mounted on the screws 16, 17, to take up friction should the compression of the wheel be such as to cause the metal around the holes to come in contact with the rollers. The rings 18, 19 in conjunction with the metal disk or the like 14 limit the bending or twsting of the wheel in an inward and outward direction.

The elastic bands or tubes may be provided with annular ribs 24 to fit annular grooves 25 in the groove in the hub and in the metal or like grooved ring or rings, to cause such bands or tubes to adjust themselves to the grooves in which they are fitted, and to prevent them from twisting or getting out of position, and they may be further provided with lugs or projections 26 at suitable distances apart to engage or enter holes or notches 27 in the sides of the hub and the metal or the like grooved ring or rings, to prevent creeping or movement in an annular direction of such bands or tubes.

When the wheel has spokes whether of wood or of wire or the like, the outer ends of the spokes carry a rim or ring having a single annular groove in it, and the arrangement of elastic bands or tubes and grooved metal or like ring or rings is the same as hereinbefore described with reference to a spokeless wheel. Fig. 8 of the drawings shows in transverse section, a portion of a wheel provided with wood spokes and two elastic tubes, and in such figure, 28 designates the hub, 29 the spokes, 30 the annularly grooved ring carried by the ends of the spokes, 31 an elastic inflatable tube fitting tightly the ring 30; 32 a metal or other strong ring having an inner and an outer annular groove and fitting tightly the elastic tube 31, 33 an elastic tube fitting tightly the metal or like ring 32, and 34 a metal hoop or tire fitting on the periphery of the elastic tube 33. 35 designates the disk or plate secured to the back of the wheel, 36 a metal ring secured by screws 37 or the equivalent to the grooved metal or like ring 32, and 38 the roller on the screw 37.

The elastic bands or tubes may be of any suitable shape in cross section, Figs. 3, and 5 to 8 inclusive of the drawings showing tubes circular in cross section with the exception of the outer or completing tube, which is broadened to provide a flat tread to receive the metal hoop, but I may employ solid elastic bands, or inflatable tubes of square or rectangular shape in cross section, and at Figs. 9 and 10 I have illustrated a portion of a wheel provided with solid elastic bands of rectangular shape in cross section, the groove in the hub and those in the metal or like ring or rings being of a shape to conform to the section of the elastic bands. 39, 40 designate two solid elastic bands, 41 the metal or like ring situated between the two said elastic bands, and 42 the metal hoop or tire. For lightening the metal ring 41, holes 43 may be made through the solid part laterally at suitable distances apart. This arrangement is particularly suitable for heavy vehicles for commercial purposes.

When the elastic portions of the wheel are in the form of inflatable tubes, the sides of such tubes are provided with suitable fabric or material 44, Fig. 7, to prevent such tubes being squeezed outwardly through the space between the hub and the annularly grooved ring, and between each two rings if a plurality of rings are employed.

The wheel is fitted to the vehicle or the like in any of the usual ways.

I claim:—

1. In a vehicle wheel, the combination, with a center portion, of annular cushions encircling the center portion, a spacing-ring arranged between the said cushions and provided with inner and outer circumferential grooves which engage with the said cushions, pins projecting laterally from the said spacing-ring, a disk secured to one side of the said center portion and arranged normally out of contact with the said cushions and ring and having holes for the said pins, and means, secured to the free ends of the pins, for limiting their movements, the lateral oscillations of the said cushions and ring in each direction being controlled by the said disk.

2. In a vehicle wheel, the combination, with a center portion, of a plurality of annular cushions arranged concentric with the said center portion, a continuous spacing-ring arranged between the said cushions, said spacing-ring being provided with circumferential grooves which engage with the said cushions and prevent them from sliding laterally, pins projecting laterally from the spacing-ring, a disk secured to the said center portion and having holes for the middle parts of the said pins, and a ring secured to the free ends of the pins and normally arranged out of contact with the disk.

In testimony whereof I affix my signature, in presence of two witnesses.

THOMAS HENRY RUSHTON.

Witnesses:
 MARY DIXON,
 LOUIS EDGAR KIPPAX.

Copies of this patent may be obtained for five cents each, by addressing the "Commissioner of Patents, Washington, D. C."